United States Patent [19]
Collins

[11] 3,868,778
[45] Mar. 4, 1975

[54] VISUAL APPROACH AND LANDING SYSTEM FOR AIRCRAFT

[76] Inventor: William O. Collins, 6258 N. Kensington St., McLean, Va. 22101

[22] Filed: June 14, 1973

[21] Appl. No.: 369,929

[52] U.S. Cl.................. 33/227, 33/286, 240/1.2, 244/114 R, 340/26
[51] Int. Cl.............................................. B64f 1/18
[58] Field of Search ............ 33/227, 277, 276, 286; 40/217; 340/25, 26; 240/1.2; 244/114 R

[56] References Cited
UNITED STATES PATENTS

| | | | |
|---|---|---|---|
| 1,349,277 | 8/1920 | Honig | 33/227 |
| 2,280,126 | 4/1942 | Metcalf | 33/286 |
| 2,455,721 | 12/1948 | Abiuso | 40/217 |
| 2,634,399 | 4/1953 | Stocker | 240/1.2 |
| 2,691,150 | 10/1954 | Davis | 244/114.5 |
| 2,784,925 | 3/1957 | Goodhart | 33/227 |
| 3,259,985 | 7/1966 | Neal | 33/286 |
| 3,447,128 | 5/1969 | Birmingham et al. | 240/1.2 |

Primary Examiner—Samuel B. Rothberg
Assistant Examiner—Richard R. Stearns
Attorney, Agent, or Firm—Clarence A. O'Brien; Harvey B. Jacobson

[57] ABSTRACT

A ground mounted indicator system for guiding the landing approach of aircraft to a runway. One or more indicator arrangements are directly viewed by the pilot while approaching the runay. Each indicator unit includes at least two horizontally aligned bars spaced on either side of a rearwardly spaced, parallel central bar. The central bar will appear to be horizontally aligned with the other two bars if the aircraft is on the proper flight path.

11 Claims, 8 Drawing Figures

On Course    Vertical O.K. Too Far To Right

On Course    Too High    Low and Left

VISUAL APPROACH AND LANDING SYSTEM FOR AIRCRAFT

This invention relates to ground mounted visual indicator systems of the direct viewing type for guiding approach of aircraft to a runway.

Various visual systems have been devised and proposed for airports to provide slope indicators visible to aircraft pilots approaching the runways in a landing pattern. Many of such visual indicator systems are complex and costly to install because of optical components, and color and lighting controls. Also, such prior systems create certain viewing problems insofar as the pilot is concerned. For example, many indicators involve overlapping images or require the assistance of cross hairs for visual alignment purposes. It is therefore an important object of the present invention to provide a visual indicator system that is inexpensive to install, avoids the visual alignment problems aforementioned and the complexities of prior indicator systems.

In accordance with the present invention, the correct slope of a flight path during approach to a runway is indicated by direct viewing of at least three horizontally elongated bars fixedly mounted close to the ground to form a visual indicator unit located adjacent to or in advance of a runway. A central one of the three bars is rearwardly spaced in parallel relation to the other two bars so that all three bars will be seen, as horizontally aligned line segments from a location along the proper flight path. Vertical misalignment of the central bar relative to the other two bars will indicate deviation from the proper flight path so that corrections may be made during approach. The indicator unit may also be provided with additional vertical bars to signify horizontal as well as vertical deviation from the proper flight path. Several indicator units may be installed to sequentially signify approach along the proper flight path toward the runway and including touchdown approach during landing. The indicator bars may be made visible by coating them with a highly reflective surface and providing surrounding floodlight illumination for nighttime visibility, or by mounting lamps directly on the bars in the form of elongated fluorescent tubes or closely spaced series of spotlights.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
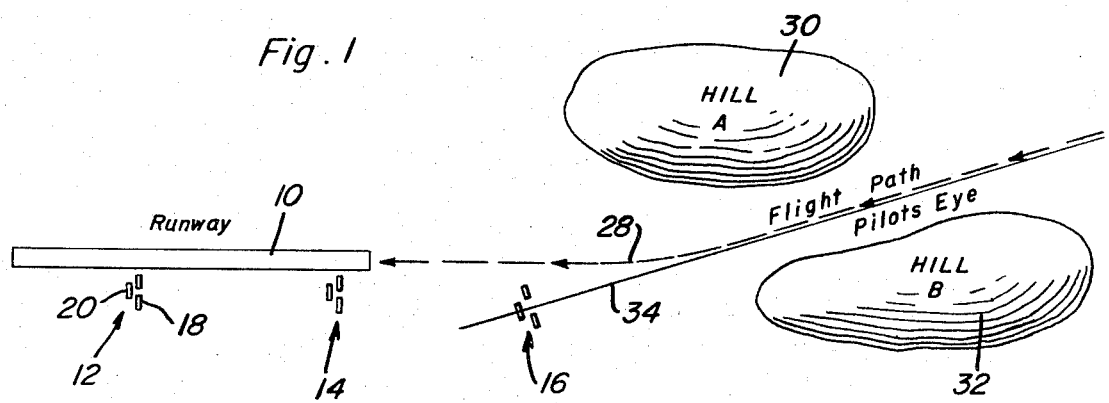
FIG. 1 is a top plan view depicting a typical flight approach to an airport runway with the visual approach indicator system of the present invention installed.
Figure 3:
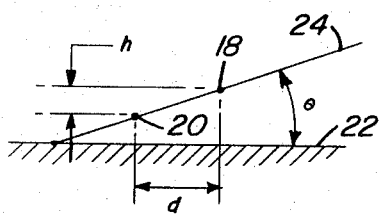
FIG. 3 is a schematic side elevational view of a typical indicator unit as used in the system depicted in FIGS. 1 and 2.

Referring now to the drawings in detail, FIG. 1 depicts an airport runway 10 with a plurality of visual indicator units 12, 14 and 16 are associated in one embodiment of the invention. Each of these indicator units are similar in construction and arrangement in that each includes three elongated indicator bars consisting of two horizontally aligned bars 18 that are longitudinally spaced from each other on either side of a parallel central bar 20. The three bars are fixedly mounted closely above the ground 22 with the central bar 20 rearwardly spaced from the other two bars 18 by a distance ($d$) as depicted in FIG. 3. The two bars 18 are furthermore positioned vertically above the central bar 20 by a distance ($h$) to establish a common line of sight 24 at a predetermined angle ($\theta$) to the ground. Each indicator unit may thereby be designed to establish a line of sight at an angle ($\theta$) corresponding to a desired vertical slope of a flight path from which a pilot observes the indicator unit in an approaching aircraft.

The indicator unit will signify to the observing pilot if he is on the proper flight path when the aircraft is a predetermined horizontal distance from the runway by virtue of the alignment of the indicator bars 18 and 20 along the line of sight 24. In such case, the central bar 20 will appear to be a line segment horizontally aligned with the other two bars 20, as shown for example in FIG. 2 with respect to indicator unit 16. Viewing of the central bar 20 symmetrically positioned relative to the bars 18 will form small gaps 26 between the bars at both ends of the central bar 20 to signify the proper horizontal slope for the flight path. It will therefore be apparent that any vertical or horizontal deviation from the proper flight path will be readily detected by observance of the indicator unit. Each indicator unit will therefore be mounted on the ground in a calculated position relative to the runway so as to indicate the desired vertical and horizontal slopes of a proper flight path.

Figure 2:
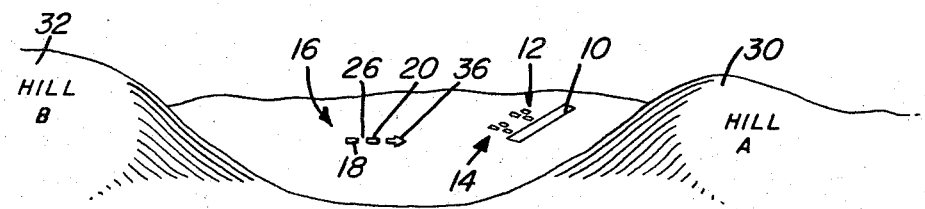
FIG. 2 is a front elevational view of the runway approach shown in FIG. 1, as viewed from an aircraft on the proper flight path.

As shown in FIG. 1, by way of example, the proper flight path 28 for an aircraft approaching runway 10 extends between two hills 30 and 32 that rise above the elevation of the flight path. Accordingly, the indicator unit 16 is located a substantial distance from the runway with its parallel indicator bars orientated perpendicular to the horizontal slope 34 of the flight path just before the path turns to a direction aligned with the runway 10. One of the bars 18 of indicator unit 16 is therefore provided with a turn indicator formation or arrow head 36 as shown in FIG. 2. When a proper turn has been executed, the next indicator unit 14 will come into clear view and all of its indicator bars will appear horizontally aligned as the aircraft assumes the proper approach slope a certain distance from the runway. The indicator unit 14 thus functions as a threshold indicator during the landing operation. The vertical approach angle decreases during the landing operation to a touchdown approach angle which will be signified by observance of the flare indicator unit 12. Thus the indicator units 12, 14 and 16 will sequentially guide the pilot in making a proper approach to and landing on the runway 10.

Figure 4:
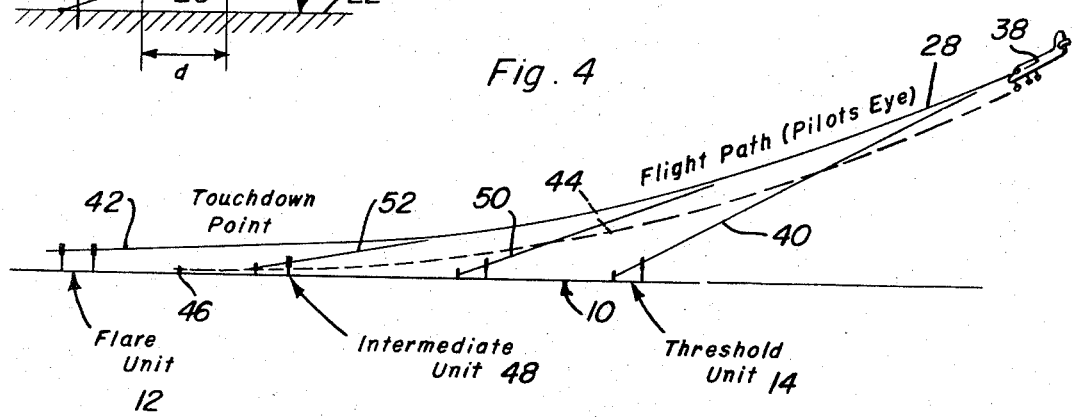
FIG. 4 is a side elevational view depicting approach and touchdown of an aircraft on a runway with which a system of the present invention is associated.

In FIG. 4, final approach of an aircraft 38 to the runway 10 is shown with the indicator units 14 and 12 defining the vertical approach slope 40 and touchdown slope 42 corresponding to the flight path 28 and the parallel landing gear path 44 tangent to the ground at touchdown point 46. The touchdown point is located sufficiently forward of the flare unit 12 so that deviation from the proper flight path slope may be corrected before touchdown. Under low visibility conditions, the decreasing flight path landing slope may be monitored by observance of intermediate indicator units 48 positioned between the touchdown point 46 and the threshold indicator unit 14 to define intermediate slope lines 50 and 52. All of the indicator units 12, 14 and 48 are mounted in close lateral spaced adjacency to the runway as shown in FIG. 1.

Figure 5:
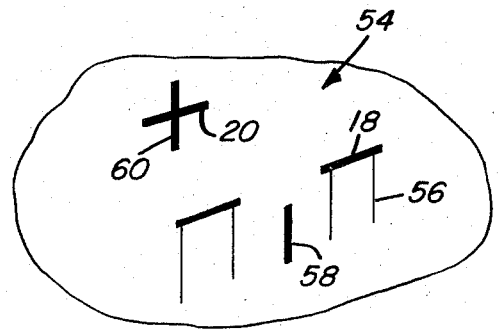
FIG. 5 is a simplified perspective view of a visual approach indicator unit designed for installation in advance of the runway.
Figure 6:
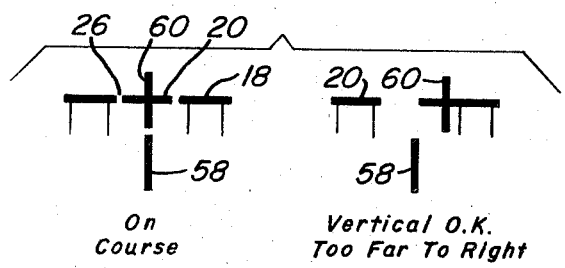
FIG. 6 is a diagrammatic view showing the indicator of FIG. 5 as viewed from an aircraft that is on course and off course.

Indicator units may also be mounted well in advance of the runway and in alignment therewith along its longitudinal direction in order to guide approaching aircraft toward the runway before final approach and landing, with respect to both horizontal deviation and vertical slope deviation. FIGS. 5 and 6 depict such an indicator unit generally referred to by reference numeral 54. As in the case of the previously described indicator units, the unit 54 includes horizontally aligned indicator bars 18 fixedly mounted above the ground by suitable supports 56 and a parallel, rearwardly spaced central bar 20. The bars 18 are also positioned above the bar 20 and forwardly thereof to establish a predetermined line of sight corresponding to a desired vertical flight path slope. The longitudinal spacing between the bars 18 is slightly greater than the length of central bar 20 so as to form the gaps 26 as aforementioned signifying "on course" as shown in FIG. 6 with respect to the horizontal. In order to emphasize any horizontal deviation, vertical bars 58 and 60 are fixedly mounted in the ground in coplanar relation to the bars 18 and 20 respectively. Thus, as shown in FIG. 6, the bars 58 and 60 will be laterally offset in either direction when there is any horizontal deviation from the flight path during approach to the runway. The vertical bar 60 in the indicator unit 54 forms a "cross" with the central bar 20.

Figure 7:
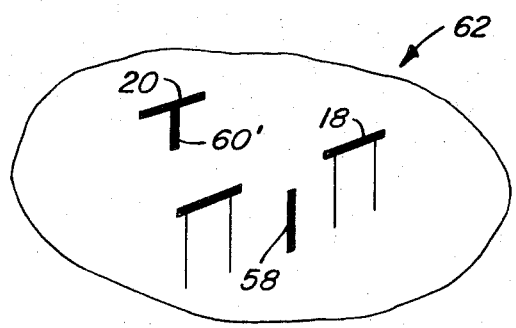
FIG. 7 is a simplified perspective view of a modified form of visual approach indicator unit similar to that of FIG. 5.
Figure 8:
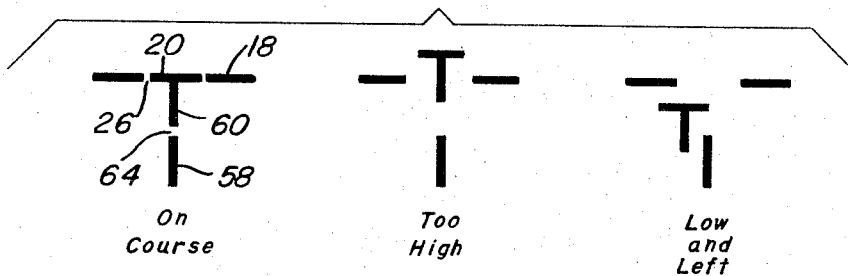
FIG. 8 is a diagrammatic view showing the indicator of FIG. 7 as viewed from aircraft that are on course and off course.

In FIGS. 7 and 8, an indicator unit 62 is depicted which is similar in arrangement and function to the indicator unit 54 except that the vertical bar 60' coplanar with central bar 20 is arranged to form a "T" formation. In this indicator unit 62 as well as unit 54, the bars when indicating an "on course" condition will all appear as line segments spaced from each other by the small horizontal gaps 26 and by the vertical gap 64. This arrangement will avoid the uncertainties of overlapping images and facilitate observation of the indicator unit.

The indicator bars in each of the disclosed embodiments may be coated with a highly reflective material to enhance visibility during nighttime under floodlight illumination. Alternatively the bars may mount elongated fluorescent or neon tube lamps that are energized under low visibility conditions. Spotlight lamps could also be utilized, mounted in close spaced relation along each of the bars to form illuminated line segment images.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A visual approach indicator unit, including at least three elongated bars, means mounting two of said bars in longitudinal alignment with each other, means mounting the third of said bars in parallel spaced relation to the two longitudinally aligned bars and centrally between said two of the bars, said two of the bars being longitudinally spaced from each other a distance slightly greater than the length of said third of the bars and visual means mounted on said bars for direct viewing of the bars themselves as closely spaced solid line segments in apparent longitudinal alignment with each other while approaching the same at a predetermined angle perpendicular to said bars.

2. The indicator unit defined in claim 1 including at least two additional bars respectively mounted in coplanar relation to said two of the bars and in coplanar relation to said third of the bars, said additional bars being orientated in perpendicular relation to the three bars to be viewed in longitudinal alignment with each other while approaching the same at an angle perpendicular to said three elongated bars.

3. The indicator unit defined in claim 1 including a directional change indicating formation connected to one of said two longitudinally aligned bars.

4. The indicator unit defined in claim 1 wherein said visual means comprises a light reflective coating on each of said bars.

5. In combination with a runway, an approach guiding system including at least one indicator unit as defined in claim 1, said bars being laterally spaced from the runway in perpendicular relation thereto to guide approach of aircraft at said predetermined angle.

6. The system of claim 5 including a second indicator unit as defined in claim 1, located at a point spaced longitudinally from said runway wherein the bars thereof are orientated at an angle to the runway.

7. In combination with a runway, a landing guidance system including at least two direct viewing indicator devices mounted on the ground adjacent the runway for sequentially signifying initial approach to the runway and touchdown approach to the ground, each of said indicator devices including at least two horizontally aligned lateral bars, a central bar disposed in parallel spaced relation to said lateral bars in such a manner that said central bar is visually aligned horizontally between and closely spaced from the two lateral bars when approaching along a proper flight path.

8. The combination of claim 7 wherein said indicator devices are mounted in close laterally spaced relation to the runway.

9. The combination of claim 7 including a third of said indicator devices mounted intermediate said two of the indicator devices for signifying continued approach along said proper flight path under low visibility conditions.

10. The combination of claim 7 including another indicator device mounted farther from the runway than said two direct viewing indicator devices for signifying a change in direction of the flight path toward the runway.

11. A visual approach indicator assembly for guiding approach of an aircraft along a predetermined descent path to a touchdown location on a landing surface, comprising two coplanar markers having elongated bar-shaped surfaces, means mounting said coplanar markers above the landing surface with said bar-shaped surfaces substantially perpendicular to said descent path for establishing separate continuous images of spaced lateral line segments during approach to the touchdown location, a third bar-shaped marker, and means mounting the third marker below the two coplanar markers and in rearward parallel spaced relationship thereto relative to said descent path for establishing a continuous image of a central line segment closely spaced from the separate continuous images of the lateral line segments, whereby said line segment images overlap in response to lateral deviation from said descent path.

* * * * *